United States Patent
Tuggle

(10) Patent No.: US 6,279,631 B1
(45) Date of Patent: Aug. 28, 2001

(54) LOW PRESSURE TIRE

(75) Inventor: William E. Tuggle, Virginia Beach, VA (US)

(73) Assignee: Primex Marketing, Inc., Benicia, CA (US)

( * ) Notice: Subject to any disclaimer, the term of this patent is extended or adjusted under 35 U.S.C. 154(b) by 0 days.

(21) Appl. No.: 09/340,120

(22) Filed: Jun. 28, 1999

(51) Int. Cl.$^7$ .................................................. B60C 17/00

(52) U.S. Cl. ...................... 152/375; 152/385; 152/454

(58) Field of Search ................................... 152/375, 454, 152/385; 301/64.4, 95, 96, 97

(56) References Cited

U.S. PATENT DOCUMENTS

| | | |
|---|---|---|
| 697,621 | 4/1902 | Greene . |
| 884,702 | 4/1908 | Bowden . |
| 1,090,727 | 3/1914 | Leach, Jr. . |
| 1,110,849 | 9/1914 | Wheeling . |
| 1,318,119 | 10/1919 | Wallace . |
| 1,457,287 | 5/1923 | Trenholme . |
| 1,493,672 | 5/1924 | Henderson . |
| 1,846,269 | 2/1932 | Musselman . |
| 1,869,620 | 8/1932 | Rogers et al. . |
| 1,875,643 | 9/1932 | Musselman . |
| 1,918,553 | 7/1933 | Musselman . |
| 1,921,772 | 8/1933 | Paull . |
| 1,965,058 | 7/1934 | Seabra . |
| 2,268,249 | 12/1941 | Goodrich . |
| 2,367,825 | 1/1945 | Shaw . |
| 2,435,186 | 1/1948 | Trexler . |
| 2,601,464 | 6/1952 | Tanke . |
| 2,607,392 | 8/1952 | Snyder . |
| 2,608,230 | 8/1952 | Cuesta . |
| 2,713,373 | 7/1955 | Daugherty . |
| 2,824,592 | 2/1958 | Neisler, Jr. et al. . |
| 2,843,171 | 7/1958 | Howe . |
| 3,024,831 | 3/1962 | McConkie . |
| 3,047,041 | 7/1962 | Bottasso et al. . |
| 3,116,778 | 1/1964 | Herzegh et al. . |
| 3,154,126 | 10/1964 | Katter . |
| 3,470,933 | 10/1969 | Molnar . |
| 3,613,762 | 10/1971 | Reinhart, Jr. . |
| 3,799,617 | 3/1974 | Holland, Sr. . |
| 3,827,369 | 8/1974 | Mueller . |
| 3,945,419 | 3/1976 | Kosanke . |
| 3,951,192 | 4/1976 | Gardner et al. . |
| 3,965,957 | 6/1976 | Nakasaki . |
| 3,977,454 | 8/1976 | Coran et al. . |
| 3,983,918 | 10/1976 | French . |
| 3,998,258 | 12/1976 | Grawey et al. . |
| 4,031,937 | 6/1977 | Georgia et al. . |
| 4,043,370 | 8/1977 | Unwin et al. . |
| 4,058,344 | 11/1977 | Dyson . |
| 4,077,452 | 3/1978 | Carn . |
| 4,081,015 | 3/1978 | Mitchell . |

(List continued on next page.)

FOREIGN PATENT DOCUMENTS 256390    8/1948   (CH) .

OTHER PUBLICATIONS

"Dura–Tech® Tire Design & Performance Characteristics", Zedron, Inc.

Primary Examiner—S. Joseph Morano
Assistant Examiner—Long Bao Nguyen
(74) Attorney, Agent, or Firm—Connolly Bove Lodge & Hutz, LLP

(57) ABSTRACT

A low pressure tire including a torus of flexible, substantially inelastic material. The material will not deform at a temperature of about 225° F. The torus includes an inner diameter surface for engaging a tire supporting rim and an outer diameter surface for contacting a support surface. The torus can flatten under a load to facilitate movement of the tire over soft or irregular support surfaces. A sealable opening permits the inflation and deflation of the torus.

27 Claims, 1 Drawing Sheet

U.S. PATENT DOCUMENTS

| | | |
|---|---|---|
| 4,146,992 | 4/1979 | Smith . |
| 4,155,393 | 5/1979 | Grawey . |
| 4,168,732 | 9/1979 | Monzini . |
| 4,174,871 | 11/1979 | Brannan . |
| 4,212,339 | 7/1980 | Dobson . |
| 4,216,810 | 8/1980 | Osada et al. . |
| 4,253,511 | 3/1981 | Curtiss, Jr. . |
| 4,253,512 | 3/1981 | Yoshioka et al. . |
| 4,267,992 | 5/1981 | Harper, Sr. . |
| 4,294,490 | 10/1981 | Woelfel . |
| 4,471,999 | 9/1984 | Browne . |
| 4,538,657 | 9/1985 | Tuggle . |
| 4,957,150 * | 9/1990 | Dionisio ................................ 152/375 |
| 5,632,829 | 5/1997 | Peterson et al. . |

\* cited by examiner

LOW PRESSURE TIRE

FIELD OF THE INVENTION

The invention relates to a wheel for moving a land vehicle over hard, soft, smooth, irregular, and/or other surfaces. The invention also relates to a land vehicle that includes such a tire. The present invention also relates to a tire and wheel combination including the tire. Furthermore, the present invention relates to a method for moving a land vehicle as well as a method for making a tire according to the invention.

BACKGROUND OF THE INVENTION

For many decades, land vehicles and also airplanes have been provided with wheels comprising a rim and a pneumatic tire mounted on the rim. Due to the rather high angular velocities of such wheels during use and the danger of rupture of the tire due to encounters with obstacles in its path, the casings of prior art tires almost uniformly have been provided with extensive reinforcements in the forms of fabrics or cords made from natural or synthetic materials or metal, or both.

In most early applications of such pneumatic tires, the tire comprised a reinforced carcass having a U-shaped cross-sectional configuration with annular beads which engaged the rim. A torus-shaped inner tube was positioned within the tire carcass in engagement with both the carcass and the outer diameter of the rim. In such wheels, which are still in extensive use, the rim and tire carcass provide the necessary mechanical strength and the tube provides the necessary airtight interior volume during operation. More recently, tubeless tires have come into general use in which the carcass of the tire is sealed directly to the rim to provide the airtight interior volume, thus eliminating any need for an inner tube.

To ensure adequate load bearing capacity, to retain such prior art tires on their rims and to ensure that such wheels can resist the torque applied to drive and brake such vehicles, the tire carcasses have typically been quite rigid and far less flexible than their inner tubes. Both tube type and tubeless tires have been inflated to a rather high operating pressure, typically well in excess of 25 pounds per square inch. When such prior art wheels are mounted on a vehicle and subjected to an axle load, the tire flattens very slightly and, in general, retains an exterior appearance quite similar to that of an uninflated, unloaded wheel.

Such prior art wheels are admirably suited for use on vehicles which operate over relatively hard, even support surfaces. However, should the vehicle encounter a soft surface such as beach sand or a rather irregular surface such as rocky terrain, then the performance of the prior art wheel often is less than satisfactory. Specifically, the contact area between the prior art tire and the underlying support surface is so small that the pressure per unit area is extremely high on the underlying support surface, which often causes the wheels of the vehicle to sink at least partially into soft support surfaces such as beach sand. On irregular surfaces, the relatively hard, unyielding nature of such prior art tire carcasses and their high inflation pressure make it difficult for the tire to yield to obstacles in its path so that the vehicle can go forward with a minimum of applied power. In some instances, large expensive wide track tires have been used in self-powered vehicles to facilitate their movement over soft and irregular surfaces due to the increased contact area of the wide track tire.

A variety of carriers or vehicles have been developed in recent years which are intended to be pulled over soft or irregular surfaces, usually manually but also by self-powered tractors. For example, U.S. Pat. No. 4,327,933 granted to W. E. Tuggle for "Sailboat Carrier" discloses a type of carrier suitable for moving catamaran sailboats across wide expanses of beach sand and into the water. While small wheels of the prior art type previously discussed can be used on such carriers, a still significant effort is required to move the loaded carrier across a beach. A need has continued to exist for a wheel having both a much larger contact surface to minimize sinking into soft surfaces and a more elastic and flexible tire body both to permit easy deformation of the tire as it rolls over obstacles in its path and to permit the contact area of the tire to increase very substantially under load.

SUMMARY OF THE INVENTION

The present invention provides a low pressure tire. The tire includes a torus of flexible substantially inelastic material such that the material will not deform at a temperature of about 225° F. The torus includes an inner diameter service for engaging a tire supporting rim and an outer diameter service for contacting a scored surface. The torus can flatten under a load to facilitate movement of the tire over soft or regular support services. The tire also includes a sealable opening for inflating and deflating the torus.

Additionally, the present invention includes a tire and wheel combination wherein the tire is substantially as described above. The wheel includes a tire supporting rim having a cylindrical center section for engaging the inner diameter surface of the tire. A pair of support flanges axially extend from opposite sides of the center section for engaging the tire as it flattens under a load.

Also, the present invention includes a wheeled vehicle that includes a frame, at least one tire as described above, at least one tire supporting rim as described above and at least one axle interconnecting the at least one rim and the frame such that the at least one rim and at the least one tire may rotate.

Furthermore, the present invention includes a method for moving a land vehicle including providing the vehicle such as that described above. The vehicle is moved across a support surface while the vehicle is supported on the at least one tire.

The present invention also includes a method for making a tire. The method includes blow molding a torus of flexible, substantially inelastic material wherein the material will not deform at a temperature of about 225° F. The torus includes an inner diameter surface for engaging a tire supporting rim and an outer diameter surface for contacting a support surface. The torus can flatten under a load to facilitate movement of the tire over soft or irregular support surfaces. A sealable opening is provided in the torus for inflating and deflating the torus.

Still other objects and advantages of the present invention will become readily apparent by those skilled in the art from the following detailed description, wherein it is shown and described only the preferred embodiments of the invention, simply by way of illustration of the best mode contemplated of carrying out the invention. As will be realized, the invention is capable of other and different embodiments, and its several details are capable of modifications in various obvious respects, without departing from the invention. Accordingly, the drawings and description are to be regarded as illustrative in nature and not as restrictive.

DETAILED DESCRIPTION OF THE INVENTION

Figure 1:
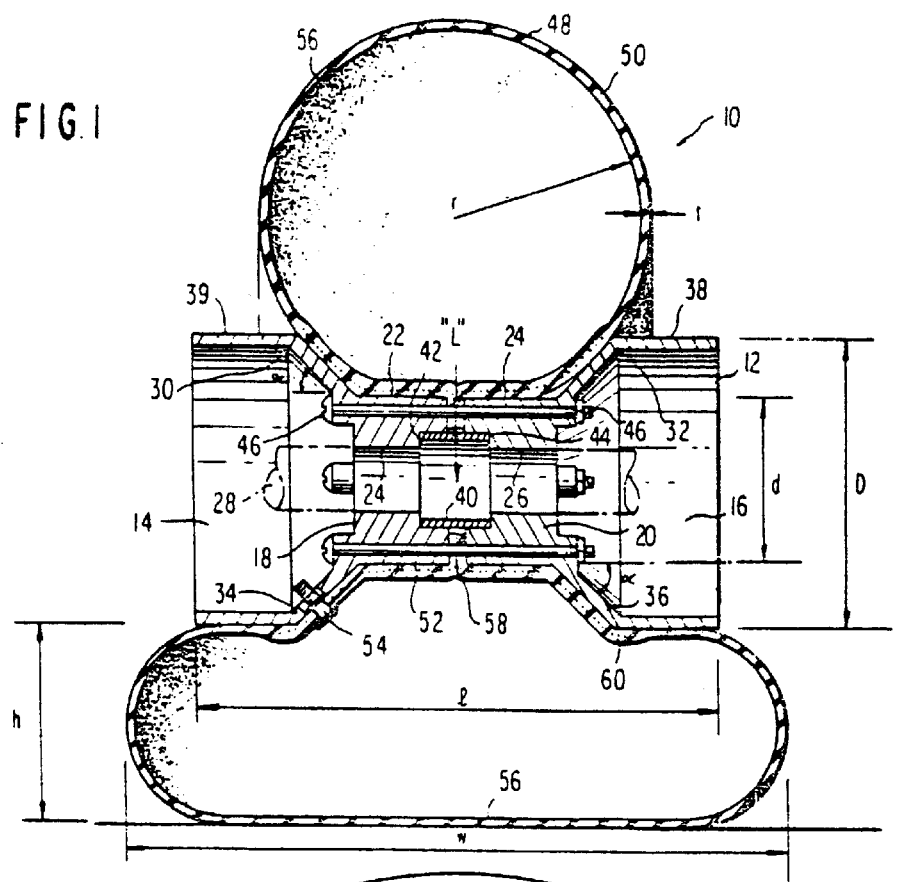
FIG. 1 shows a sectional elevation view of an embodiment of a wheel according to the present invention, indicating the substantially flattened configuration assumed by the torus-like tire when a load is applied to the assembly.

Recognizing the need for a tire that can travel over soft and irregular surfaces, it must also be recognized that typically, a vehicle needs to traverse more than one type of surface. Also, other surfaces exist that have special requirements. Furthermore, loads and vehicles exist that require special handling. A need exists for a tire and/or wheel that can address all of these issues.

A tire according to the present invention is made of a flexible, substantially inelastic material. In other words, while the material may deform if a force is applied against it, it will not stretch or stretch very little when force is applied against it. This is opposed to material, such as rubber or rubber-like materials, which while they may deform are also very elastic and will stretch.

Advantages to a tire made of a material according to the present invention include that the tire can be used on all types of surfaces, whether hard or soft, regular or irregular, and having any other contour configuration. For example, a tire according to the present invention may be inflated to a greater pressure for use on hard surfaces.

Along these lines, an advantage of the material of the tire of the present invention is that it could be used on hard surfaces without marring or denting the surfaces as a hard tire might. For example, the tire according to the present invention could be utilized on a surface such as light foam core aluminum flooring utilized in the aircraft industry without indenting the flooring as conventional wheels can. Heavy loads often need to be carried across airplane flooring. For example, galleys are loaded and unloaded from planes. Galleys in larger planes, such as a 747 may weigh up to 1200 pounds.

Since all conventional wheels that have been used to transport galleys or other heavy loads over airplane flooring have indented or creased the flooring, costing several thousand dollars in repair, galleys and heavy loads have been carried by several men, in some cases up to 10 men. With the present invention, the same objects can be rolled over the airplane flooring without damaging it by two men with ease. Obviously, lifting the load so heavy can result in back injuries with resulting medical and lost work expenses as well as increased insurance rates. The present invention can help reduce these costs.

Also, due to its flexibility, a tire according to the present invention can be inflated sufficiently to permit heavy loads to be carried across such sensitive surfaces. A significant advantage of the present invention is that the inflation level can be adjusted according to the weight that is being carried and the surface it must perform on for optimum performance. In some cases, wheels may not be used on such surfaces. Therefore, the present invention can provide a great advantage over what is currently being utilized.

Unlike a tire according to the present invention, a tire made of rubber not reinforced with fabric or cords typically will simply stretch out to the sides and increase in diameter if greater inflation is applied if the tire is carrying a heavier load. In other words, a tire made of a more elastic material may not even be able to carry a heavier load due to its elastic nature. Such does not occur with a tire according to the present invention.

Along these lines, a tire according to the present invention will not stretch out laterally so much that it rubs against the structure of the vehicle being transported by the tire, as a more elastic material could. Due to its inelastic properties, a tire according to the present invention may also not stretch to the extent that it would rub on the inside of a yoke supporting a wheel on which the tire is mounted. If the tire were supporting a wheelbarrow, and it were further inflated to carry heavier loads over soft terrain or to serve as a hard tire on hard surfaces, the inelastic nature of the tire can also prevent the tire from increasing in diameter and rubbing against the wheelbarrow bucket. The inelasticity of the material utilized in the tire according to the present invention would also help to prevent the tire from rubbing against other parts of a vehicle in which the tire is mounted.

Since the tire according to the present invention is made of substantially inelastic material, it may be inflated until hard, without stretching so that it can be used in applications where a hard conventional wheel might ordinarily be utilized. A hard conventional wheel including solid hard rubber wheels. On the other hand, a tire according to the present invention may also be deflated for use on softer and irregular support surfaces.

As a result of the properties of a tire according to the present invention, not only can it be used on soft surfaces, such as mud, sand, among others, and uneven surfaces, but also on hard surfaces since the tire can be inflated without elastic expansion. Since the tires according to the present invention are formed of a flexible material, they can be utilized in applications where sensitive equipment, such as electronic equipment, is being carried the material of the tires will absorb shock to help avoid jostling and damaging the sensitive materials.

An example of the material that may be utilized in the tire according to the present invention is polyurethane. The polyurethane could be thermoplastic. Additionally, the polyurethane could be a polyether-based grade polyurethane. One example of a thermoplastic polyether-based grade polyurethane that may be utilized according to the present invention is TEXIN 985U polyurethane available from Bayer corporation. This polyurethane has a Shore hardness of about 85S. Other polyurethanes or other materials having similar characteristics, such as Shore hardness, abrasion resistance, impact strength, toughness, flexibility, and/or resistance to UV exposure, could also be utilized.

The wall thickness of a tire according to the present invention can vary greatly with the diameter and/or width of the tire, the weight load and the application. One embodiment of the present invention utilizes a tire about ten inches high and about four inches wide for golf bag pull carts and baby strollers. The maximum weight it is foreseen that such a tire will carry is approximately 75-pounds. The wall thickness of this embodiment may be as low as about $3/32$ of an inch.

According to other embodiments, the same size wheel may be used on a hand truck. However, such an embodiment would include a wall thickness of about $1/8$ of an inch. With a larger tire, for example, 18 inches high by 8 inches wide, the wall thickness, depending on the load and application may be about $1/4$ of an inch.

By nature of the molding process, typically, the tire is uniformly thick around its entire wall. However, the tire may be differentially thick.

Other materials, such as various plastics, that would provide a tire with the same or similar properties to a polyurethane tire could also be utilized. These properties can include elasticity, flexibility, temperature tolerance characteristics, chemical make-up, among others.

Another advantage of the tire according to the present invention is that it may be utilized in extreme temperatures. For example, a tire, such as a tire made of polyurethane, could be used on hot concrete, asphalt, or inside hot vehicles in the sun, where temperatures can exceed 225° F. without experiencing deformation. Many plastic tires have limits on the conditions in which they may be utilized. For example, an elastomeric plastic tire may start to deform at temperatures of about 120° F. to about 150° F. Since concrete, asphalt, metal and other surfaces may exceed about 120° F. in the summer, such tires could not be utilized on such surfaces. Also, the interior of a motor vehicle can exceed about 225° F. in the summer. An elastomeric plastic type tire would deform under such conditions. In view of the above, the present invention may be utilized in a greater number of applications as compared to known tires such as tires made of a material disclosed in U.S. Pat. No. 4,538,657 to W. E. Tuggle, issued Sep. 3, 1985.

Figure 2:
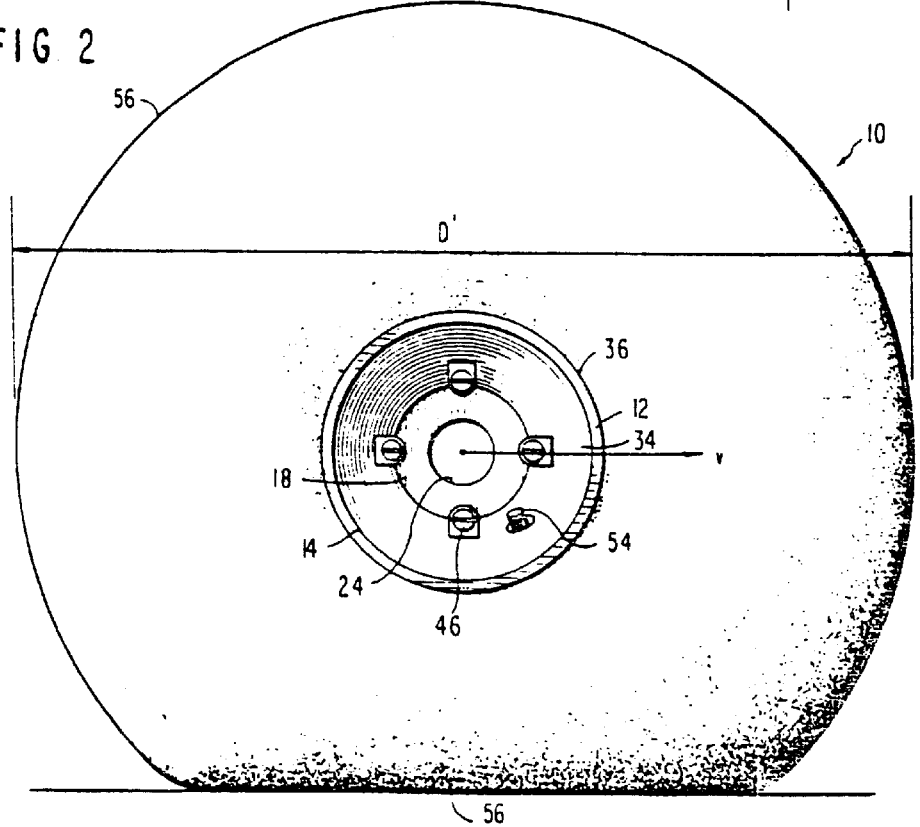
FIG. 2 shows a side view of the embodiment of the wheel illustrated in FIG. 1.

A low pressure tire according to the present invention typically includes a torus of flexible, substantially inelastic material. As described above, the material may be a polyurethane or polyurethane like material. FIG. 2 illustrates an embodiment of a tire according to the present invention.

The material of a low pressure tire according to the present invention will not deform at temperatures of up to or over about 225° F. The torus, as illustrated by the embodiment shown in FIGS. 1 and 2, includes an inner diameter surface 52 for engaging a tire supporting rim 12, shown in FIG. 1. The tire supporting rim 12 will be described below in greater detail. The torus also includes an outer diameter surface 56 for contacting a support surface.

The material that the torus is made of is such that the torus can flatten under a load to facilitate movement of the tire over soft or irregular support surfaces. As described above, the torus can also move over hard support surfaces. A low pressure tire according to the present invention also includes a sealable opening for inflating and deflating the torus.

The sealable opening for inflating and deflating the torus may be any typical structure for inflating a tire or other structure. For example, a conventional valve stem member may be provided on the tire and/or wheel. Alternatively, the tire could include an inflation needle valve such as the type utilized in basketballs, for example. FIGS. 1 and 2 illustrate an embodiment that includes an inflation element 54.

The outer diameter surface that contacts the support surface typically is at least substantially free from reinforcing fabrics or cords. However, such reinforcing materials 60 may be present in the vicinity of a tire supporting rim 12 to provide extra strength in the area where the tire engages the rim. In spite of this, it is not necessary that a tire according to the present invention includes such reinforcements anywhere. Absence of any reinforcing fabrics or cords may help a tire according to the present invention to flatten or deform as desired.

As stated above, the flexible inelastic material that a tire according to the present invention is made of typically deforms but does not stretch upon encountering an obstacle under a load. When inflated to a lesser degree, the tire may be spread out under a load to facilitate movement over soft or irregular support surfaces. Typically, in such conditions, a tire according to the present invention may be inflated no more than about 10 pounds per square inch to help ensure that the tire will flatten to help provide sufficient contact surface to reduce rolling friction between the tire and the soft or irregular support surface. The tire may thereby permit an associated vehicle to move easily over soft or irregular support surfaces. As a load on the tire increases, the contact surface of the tire may increase as well.

Although a tire may be inflated to no more than about 10 pounds per square inch, lower pressures may also be useful when moving over soft and/or irregular support surfaces. In fact, pressures as low as about 1 psi to about 2 psi have proven suitable for many applications. Any support surface, whether soft, hard, regular or irregular is typically directly contact by the outer diameter surface of the torus. Typically, when inflated to a low pressure, the tire will have characteristics, such as flexibility to permit the tire to flex under the load to flatten at least partially from its unloaded configuration and will continue to flatten as the load is increased. Thus, a tire according to the present invention provides an enlarging contact area between its outer diameter and underlying soft or irregular surfaces. However, this is subject to the relatively inelastic nature of the material according to the present invention.

While a tire may be inflated to a pressure as low as about 1 psi to about 2 psi, the tire according to the present invention may also be inflated up to a pressure of about 10 psi. Inflation to greater pressures can permit the tire according to the present invention to be utilized on harder support surfaces.

For a given inflation pressure, there is a limit to the size of the contact area between the tire and the support surface. This limit is about one half of the circumference of the torus. By flattening, the tire according to the present invention can reduce rolling friction. For the same reasons, the tire will flex when it encounters and rolls over obstacles under a load. Thus, bouncing is reduced.

A tire according to the present invention may also include a radially outwardly extending flange 30 and 32, in the embodiment illustrated in FIGS. 1 and 2. The flange may help to engage the tire with a wheel as described below in greater detail. This can help to ensure that the tire does not move with respect to the wheel.

While the tire according to the present invention may be formed utilizing any suitable method, typically, a tire according to the present invention is blow molded. Blow molding typically is a more economical, efficient and less labor intensive method for forming a flexible polyurethane product.

The tire according to the present invention may be mounted on a wheel. Therefore, the present invention also includes a tire and wheel combination. The tire and wheel combination according to the present invention includes a tire as described above.

The tire and wheel combination also includes a tire supporting rim. The tire supporting rim typically includes a cylindrical center section for engaging the inner diameter surface 52 of the tire. A pair of support flanges 30 and 32 axially extend from opposite sides of the center section of the rim for engaging the tires that flattens under a load.

The wheel according to the present invention may comprise a single unitary member. Alternatively, the wheel may include more than one section that are joined together to form the wheel. For example, the wheel, or wheel rim, may comprise two separate axially extending halves 14 and 16. The halves may be joined together to form the entire wheel. The halves of the wheel may be joined by any suitable fasteners. One example of fasteners that may be utilized to connect the two halves includes a bolt and a nut, together identified as 46, that extend through cylindrical portions 18 and 20.

An embodiment of the wheel that includes two halves is particularly useful where the tire includes the inwardly extending flange 58. The flange of the tire may be clamped between the two halves upon assembly of the halves of the wheel. The halves may then be secured together.

Whether a wheel according to the present invention includes two or more sections or single section, the center section of the wheel may receive an axle extended therethrough. For this purpose, a central bore, or in the case of a tire including two halves, central bores 24 and 26, as in the embodiment illustrated in FIGS. 1 and 2, may be provided in wheel or in each wheel half for receiving an axle 28.

The wheel may rotate about the axle. Alternative, if the center section of the wheel receives an axle, the axle and the wheel may rotate together. According to such an embodiment, the axle and the wheel may be joined together or otherwise engage each other such that they rotate together.

An axle may also include two axle portions axially extending from opposite sides of the wheel. Typically, the axle and wheel would rotate together in such an embodiment.

A rim of a wheel according to the present invention may include one or more sleeves and/or one or more ball bearings. The sleeve(s) and/or ball bearing(s) may help to facilitate rotation of the wheel and/or axle.

If the wheel includes two sections, they may be virtually identical halves. The halves may comprise central cylindrical portions 18 and 20 having substantially cylindrical outer surfaces 22 and 24 having a diameter D. Whether or not the tire includes two halves, the cylindrical portion may have a substantially cylindrical outer surface having a diameter D. The cylindrical surface engages the low pressure tire according to the present invention.

As referred to above, the central portion, or in the case of wheel comprising two halves, the central portions, may be joined to oppositely, axially extending support flanges having radially outward flaring conical portions 34 and 36. The conical portions may have cone angles a in the range of about 20° to about 80°.

A pair of axially extending cylindrical flanges 38 and 39 are joined to the conical portions 34 and 36. Each cylindrical flange has a diameter D that is larger than the diameter d of the central cylindrical portion. Typically, the diameter D of the cylindrical flanges is no more than three times the length of diameter d of the central section. This may help to prevent the tire from working away from the rim during use.

The cylindrical outer surfaces 22 and 24 and the outer surfaces of the conical portions 34 and 36 engage a low pressure tire 48 according to the present invention.

In the event that the wheel includes two halves, between the halves, a cylindrical spacer 40 may be received on oppositely facing recesses 42 and 44 provided at the inner ends of the cylindrical portions 18 and 20 of the two halves. In some applications, it may be desirable to provide the rim 12 with a suitable roller, ball, or plain bearing engaging an axle shaft 28.

The thickness of the torus 50 as inflated may be from about 1 psi to about 10 psi. The thickness of the torus 50 may depend upon the application that the wheel is intended for. Wheels intended to carry heavy loads may be thicker than wheels intended to carry lighter loads. For example, a wheel barrow wheel including a tire according to the present invention may have a thicker wall than a wheel intended for use on a baby stroller. The wall thickness of a tire according to the present invention may vary from application to application, depending at least in part upon the weight of the load and texture of the terrain. One of ordinary skill in the art could determine appropriate thicknesses without undue experimentation once aware of the present disclosure.

The radius of the circle of revolution of the torus may also vary depending upon the embodiment. For example, a wheelbarrow wheel may have a much greater radius of the circle of revolution to compare to a stroller wheel. Similarly, the diameter of the torus may vary with varying applications.

The inner diameter surface 52 of the torus 50 of the tire engages the outer surfaces of the rim 12 as described above. Typically, inner diameter surface of the torus has the same diameter as the outer diameter of the rim. Typically, the axial length of the wheel according to the present invention is greater than or equal to about twice the radius of the circle of revolution of the torus but no greater than about $\pi$ times the radius. Such a range of dimensions may provide adequate contact surface between the rim and the tire as the tire deforms during use.

According to one embodiment, a tire according to the present invention distributes a load sufficiently to permit loads of about 1200 pounds to travel across the surface without damaging the surface. Typically, six to eight wheels may be utilized on a vehicle in such cases. However, any number of wheels may be utilized. Along these lines, less than six or more than eight wheels may be utilized.

The present invention also includes a wheeled vehicle. A wheeled vehicle according to the present invention includes a frame, at least one tire according to the present invention, at least one tire supporting rim according to the present invention, and at least one axle interconnecting the rim and the frame such that the at least one rim and at the least one tire may rotate. The configuration of the frame may vary, depending upon the type of wheeled vehicle. Examples of vehicles according to the present invention include a wagon, a wheelbarrow, a tricycle, a stroller, a golf bag pull cart, a beach cart, a beach wheelchair, a small boat dolly, a one wheeled cart, a two wheeled cart, a three wheeled cart, a four wheel cart, a cart with more than four wheels, a hand truck, a back pack carrier, a luggage carrier, and a vendor cart. The frames and configurations of such vehicles are well known and it is not necessary to go into further detail regarding the vehicles here.

Of course, any vehicle could utilize tires and wheels according to the present invention. Along these lines, the size of wheels and tires utilized for various applications will vary, depending upon the size of the vehicle as well as the load to be carried, among other factors. One of ordinary skill in the art could determine the appropriate size tire and wheel to utilize for a specific vehicle without undue experimentation once aware of the disclosure contained herein.

The present invention also includes a method for moving a land vehicles such as that described above. The method includes providing the vehicle with at least one tire according to the present invention and at least one tire supporting rim according to the present invention. The vehicle is then moved across the support surface while the vehicle is supported on the tire. The support surface can include any one or more of the following or other surfaces including light foam core aluminum, sand, mud, asphalt, concrete, soil, grass, ice, snow, rock, gravel, leaves, tree trunks, tree branches, and wood.

The present invention also includes a method for making a tire. The method includes blow molding a torus. According to one embodiment, the blow molding generally includes melting the material that the tire is to be made of. The melting temperature could vary, depending upon the material being utilized. For example, materials such as those described herein may be melted at temperatures of about 350° F.–360° F. to about 425° F.–430° F.

The melted material is extruded into a parison. The material may be extruded with a pressure of about 500 psi to about 2000 psi. of course, the extrusion pressure may vary and could be more or less, depending upon the particular material being extruded. After extrusion, the parison is vertically dropped out of a die utilized in the extrusion.

A round cylinder mold then clamps about the parison. The clamping force on the mold may be from about one ton to about three tons per square inch. A needle may then be inserted into the parison. Air and/or other gas is injected into the parison to force the parison and, hence, the material making up the parison, to take the shape of the mold clamped around the parison. The air pressure may vary from about 10 psi to about 50 psi. Any of the parameters described herein for the blow molding process may be varied. Those of ordinary skill in the art could determine appropriate values for the various process parameters without undue experimentation.

The method also includes providing a sealable opening in the torus for inflating and deflating the torus.

Providing vehicles such as strollers with tires such as those according to the present invention may permit such vehicles to be utilized on support surfaces where they traditionally have not been usable. The present invention may also make it possible to use the same vehicle on a variety of surfaces. For example, at the beach where the strollers may be wheeled off a sidewalk or boardwalk directly onto the sand and operate efficiently on the sand. Traditionally, strollers cannot be utilized at all or very inefficiently on sand. The present invention can permit strollers to be utilized on sand and/or move from a harder support surface on to sand.

The foregoing description of the invention illustrates and describes the present invention. Additionally, the disclosure shows and describes only the preferred embodiments of the invention, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

I claim:

1. A low pressure tire, comprising:
   a torus of flexible, substantially inelastic material, wherein the material will not deform at temperature of about 225° F., the torus includes an inner diameter surface for engaging a tire supporting rim and an outer diameter surface for contacting a support surface, wherein the torus flattens under a load to facilitate movement of the tire over soft or irregular support surfaces; and
   a sealable opening for inflating and deflating the torus.

2. The tire according to claim 1, wherein the material is polyurethane.

3. The tire according to claim 1, wherein the material is a material having elasticity, flexibility, chemical and temperature tolerance characteristics similar to polyurethane.

4. The tire according to claim 1, wherein inflation of the tire is increased to facilitate movement of the tire over a hard support surface and inflation of the tire is decreased to facilitate movement of the tire over a soft support surface.

5. The tire according to claim 1, further comprising:
   a radially inwardly extending flange.

6. The tire according to claim 1, wherein the outer diameter surface that contacts the support surface is at least substantially free from reinforcing fabrics or cords.

7. The tire according to claim 1, wherein the tire is inflated to a pressure of about 1 psi to about 10 psi.

8. The tire according to claim 1, wherein the flexible inelastic material flexes or flattens under a load but does not stretch, whereby upon further inflation the tire will not expand substantially outward.

9. The tire according to claim 1, wherein the flexible inelastic material flexes to deform but does not stretch upon encountering an obstacle when under a load.

10. The tire according to claim 1, wherein the tire is blow molded.

11. A tire and wheel combination, comprising:
    a low pressure tire comprising a torus of flexible, substantially inelastic material, wherein the material will not deform at temperature of about 225° F., the torus includes an inner diameter surface for engaging a tire supporting rim and an outer diameter surface for contacting a support surface, wherein the torus flattens under a load to facilitate movement of the tire over soft or irregular support surfaces, and a sealable opening for inflating and deflating the torus; and
    a tire supporting rim comprising a cylindrical center section for engaging the inner diameter surface of the tire, a pair of support flanges axially extending from opposite sides of the center section for engaging the tire as it flattens under a load.

12. The tire and wheel combination according to claim 11, wherein the material that the tire is made of is polyurethane.

13. The tire and wheel combination according to claim 11, wherein the material that the tire is made of is a material having elasticity, flexibility, chemical and temperature tolerance characteristics similar to polyurethane.

14. The tire and wheel combination according to claim 11, wherein inflation of the tire is increased to facilitate movement of the tire over a hard support surface and inflation of the tire is decreased to facilitate movement of the tire over a soft support surface.

15. The tire and wheel combination according to claim 11, wherein the center section of the wheel receives an axle extending therethrough and the wheel rotates about the axle.

16. The tire and wheel combination according to claim 11, wherein the center section of the wheel engages an axle extending therethrough and the wheel and the axle rotate together.

17. The tire and wheel combination according to claim 11, wherein the wheel further comprises an axle axially extending from opposite sides.

18. The tire and wheel combination according to claim 11, wherein the cylindrical flange portion of the wheel has a greater diameter than the diameter of the inner surface.

19. The tire and wheel combination according to claim 11, wherein the cylindrical flange portion of the wheel has a diameter less than three times the diameter of the inner surface.

20. The tire and wheel combination according to claim 11, wherein the tire further comprises a radially inwardly extending flange.

21. The tire and wheel combination according to claim 20, wherein the rim further comprises two separable axially extending halves between which the radially inwardly extending flange is clamped upon assembly of the two halves, and means for securing the halves to each other.

22. The tire and wheel combination according to claim 11, wherein the outer diameter surface that contacts the support surface is at least substantially free from reinforcing fabrics or cords.

23. The tire and wheel combination according to claim 11, wherein the tire is inflated to a pressure of about 1 psi to about 10 psi.

24. The tire and wheel combination according to claim 11, wherein the flexible inelastic material flexes or flattens under a load but does not stretch, whereby upon further inflation the tire will not expand substantially outward.

25. The tire and wheel combination according to claim 11, wherein the flexible inelastic material flexes to deform but does not stretch upon encountering an obstacle when under a load.

26. The tire and wheel combination according to claim 11, wherein the torus has a circular area of revolution and an axial length of the tire supporting rim is at least twice an undeformed radius of the circular area of revolution of the torus but no greater than $\pi$ times the radius.

27. The tire and wheel combination according to claim 11, wherein each flange comprises a radially outwardly flaring conical portion extending from the central section and an axially extending cylindrical flange portion extending from the conical portion.

* * * * *